United States Patent [19]

Peroutky

[11] Patent Number: 4,487,093

[45] Date of Patent: Dec. 11, 1984

[54] DISPENSER FOR SCREW FASTENER NUTS

[75] Inventor: Donald C. Peroutky, Schenectady, N.Y.

[73] Assignee: General Electric Company, Fort Wayne, Ind.

[21] Appl. No.: 310,678

[22] Filed: Oct. 13, 1981

Related U.S. Application Data

[63] Continuation of Ser. No. 169,024, Jul. 15, 1980, abandoned.

[51] Int. Cl.³ .............................................. B25B 23/02
[52] U.S. Cl. .................................................. 81/57.37
[58] Field of Search ................. 81/57.37, 431; 29/813; 10/162 R; 414/411, 414, 403

[56] References Cited

U.S. PATENT DOCUMENTS

| | | |
|---|---|---|
| 2,687,233 | 8/1954 | Wenckus . |
| 2,763,173 | 9/1956 | Bailey et al. . |
| 2,843,166 | 7/1958 | Van Alstyne . |
| 3,104,458 | 9/1963 | Conviser . |
| 3,132,766 | 5/1964 | Kerger . |
| 3,841,293 | 10/1974 | Laporte et al. ..................... 221/289 |

OTHER PUBLICATIONS

Samuel Hunt Drake, Thesis, MIT, Sep. 1977, The Charles Stark Draper Lab., Inc., pp. 26 and 91–97.

Primary Examiner—James L. Jones, Jr.
Attorney, Agent, or Firm—Ralph E. Krisher, Jr.

[57] ABSTRACT

A tool for a programmed assembly machine reliably dispenses nuts into sockets which in turn drive the nuts onto screws. The nuts rest on thin gate blades and loosely engage guide pins projecting up from the drive sockets. To dispense, the blades are pivoted by an actuator pin on the gripper to slide from under the nuts which fall by gravity onto the drive sockets, guided by the projecting pins. Other small apertured fastener parts such as washers can be dispensed by the tool.

13 Claims, 4 Drawing Figures

DISPENSER FOR SCREW FASTENER NUTS

This application is a continuation of application Ser. No. 169,024, filed July 15, 1980, now abandoned.

BACKGROUND OF THE INVENTION

This invention relates to a mechanical dispenser of threaded nuts, washers, and similar fastener parts, and especially to a dispensing tool for a programmed assembly machine.

Many automatic assembly operations involve the manipulation of screw fasteners. In the automatic assembly of fractional horsepower motor parts, end bells are typically fastened to stator housings with long tie bolts and nuts. The nuts must first be rapidly and reliably inserted into drive sockets before other assembly operations, to be available for engagement when tie bolts are assembled. An object of this invention is to conserve time by the fast dispensing of one or more nuts (or other such parts) simultaneously by a single actuating source, and to do this with a simple and relatively low cost dispensing tool.

SUMMARY OF THE INVENTION

A mechanical dispenser for threaded nuts and other small apertured fastener parts has a housing with one or more through-apertures for passage of the fastener parts by gravity. A pivoted gate blade having a cam surface is associated with each such through-aperture; spring means urges the blade to a gate closed position blocking the aperture and supporting a fastener part that has been deposited in it. To dispense, an actuator engages the blade cam surface, pivoting the blade from under the part and unblocking the aperture so that the part is released.

The illustrative embodiment is a nut dispensing system and tool for a programmed assembly machine designed to automatically assemble small motors or other devices of similar configuration. The robotic machine has an assembly station with a plurality of nut drive sockets which are modified to have retractable guide pins down which the threaded nuts slide to prevent cocking of the part and insure reliable nut to socket insertion. The system further includes a gripper or hand for moving the dispenser tool from a nut loading position to the assembly station; the gripper is modified to have a retractable actuator pin. The dispensing tool has plural through-apertures and radial, pivoted gate blades with transverse slots at one end. After loading with nuts, the dispenser is picked up by the gripper and placed over the drive sockets such that the guide pins project into the apertures and pass through the blade transverse slots and loosely thread the nut apertures. The gripper now moves the actuator pin into and out of engagement with the blade cam surfaces, causing all the blades to slide horizontally from under the nuts so that the nuts fall, guided by the projecting pins, onto the drive sockets. The assembly machine removes the dispensing tool to permit subsequent assembly operations.

DESCRIPTION OF THE PREFERRED EMBODIMENTS

Figure 1:
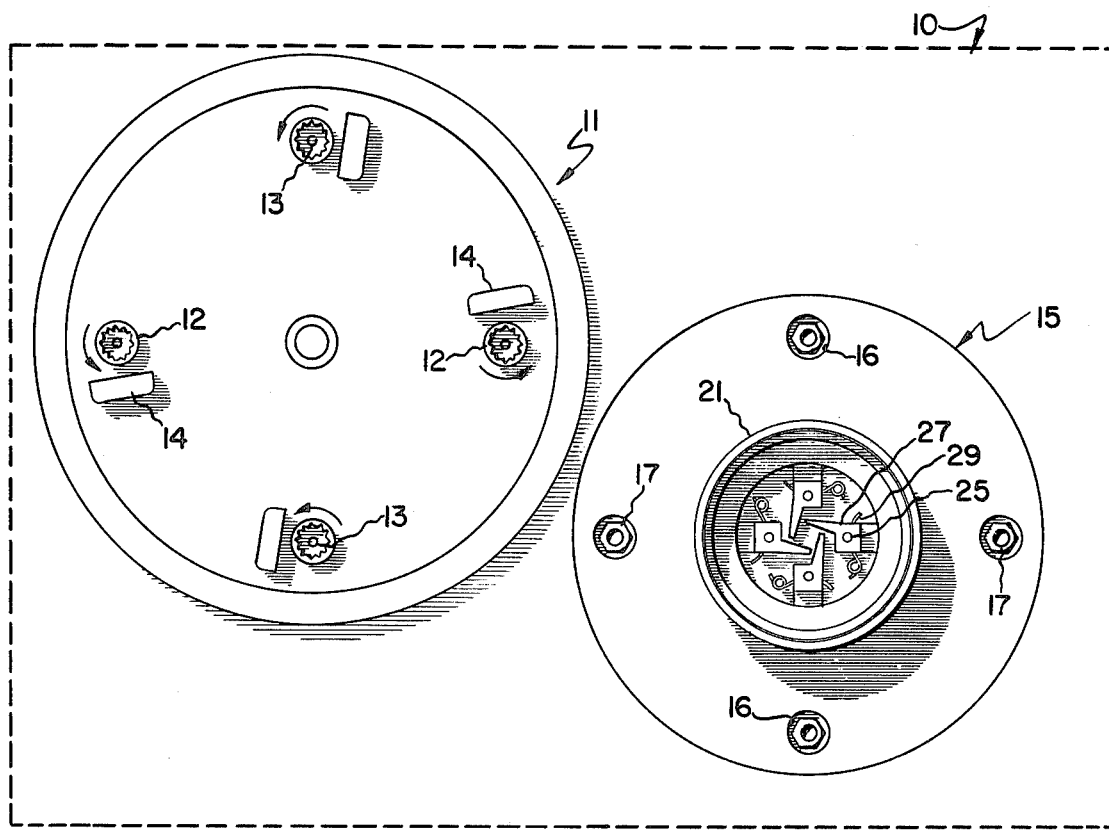
FIG. 1 is a plan view of the assembly station of a robotic machine and of the nut dispensing tool.

Part of the assembly fixture base plate 10 of a robotic machine which automatically assembles small electric motors is shown in FIG. 1. An assembly station indicated generally at 11 has four vertically mounted, motorized drive sockets 12 into which threaded nuts are to be dispensed. These are conventional 12-point drive sockets with the modification that there is an upwardly projecting guide pin 13 at the center of the drive socket; the pin is easily pushed down by a tie bolt in a later stage of the assembly operation. Vertical posts 14, one per drive socket, are received within (not shown) holes in the bottom plate of a nut dispenser tool 15 to align the tool with respect to the sockets when the tool is moved to the assembly station and placed over the drive sockets ready to dispense the threaded nuts.

Figure 2:
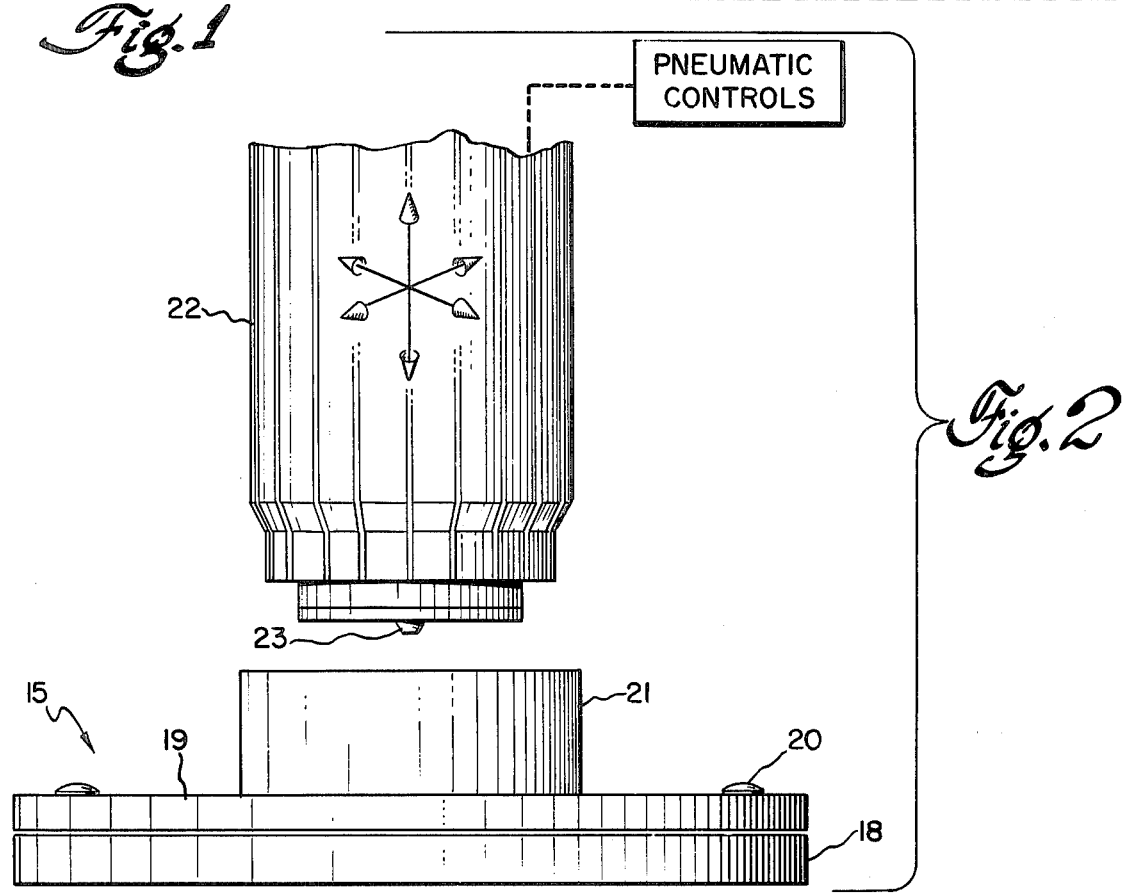
FIG. 2 is a side view of the machine's gripper and of the nut dispenser.

Nut dispenser 15 is depicted in FIG. 1 in the loading position near one edge of base plate 10. The tool has a plurality of through-apertures 16 in which the threaded nuts 17 are held over thin movable gates in a geometric pattern peculiar to the assembly involved. Typically an auxiliary feeding device, such as a commercially available vibratory type feeder, deposits nuts into the individual holes 16 of the holder. Nut dispenser 15 is indexed around as loading proceeds. Referring to FIG. 2, the tool housing is comprised of a bottom plate 18 to which a cover 19 is fastened by screws 20, and the cover has an upstanding gripper section or drum 21 by which tool 15 may be picked up and moved from one location to another. The "hand" or gripper of the programmed assembly machine is typically a pneumatically operated, split-finger expandable chuck gripper 22 that is movable, upon command, up and down and in the x and y directions. The gripper is conventional and is modified to have a recessed center pin 23 which is lowered at the proper time and actuates release of the threaded nuts 17.

Figure 3:
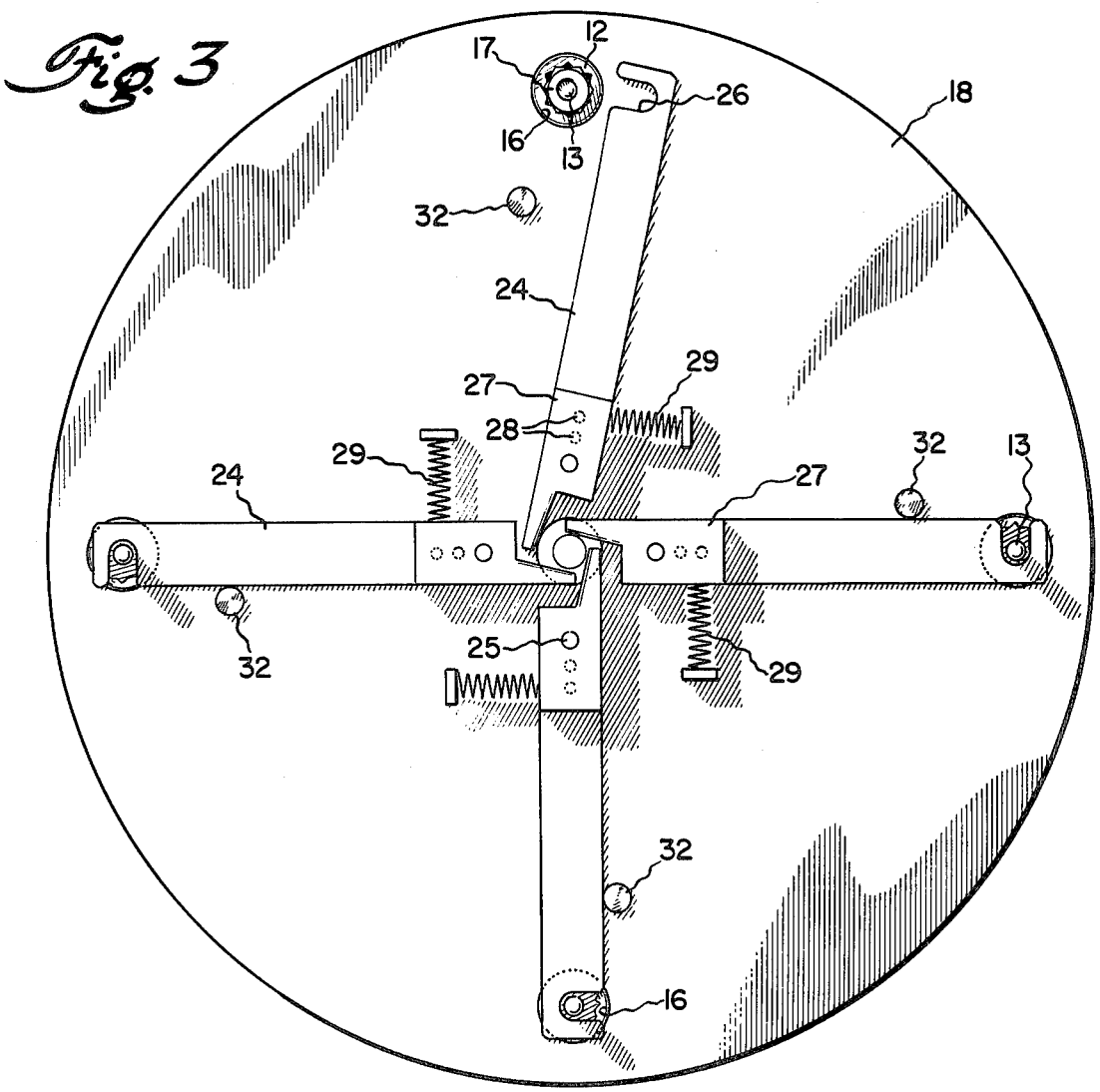
FIG. 3 is a diagrammatic plan view of the dispensing tool bottom plate and mechanism showing the pivoted blades in both gate open and gate closed positions.
Figure 4:
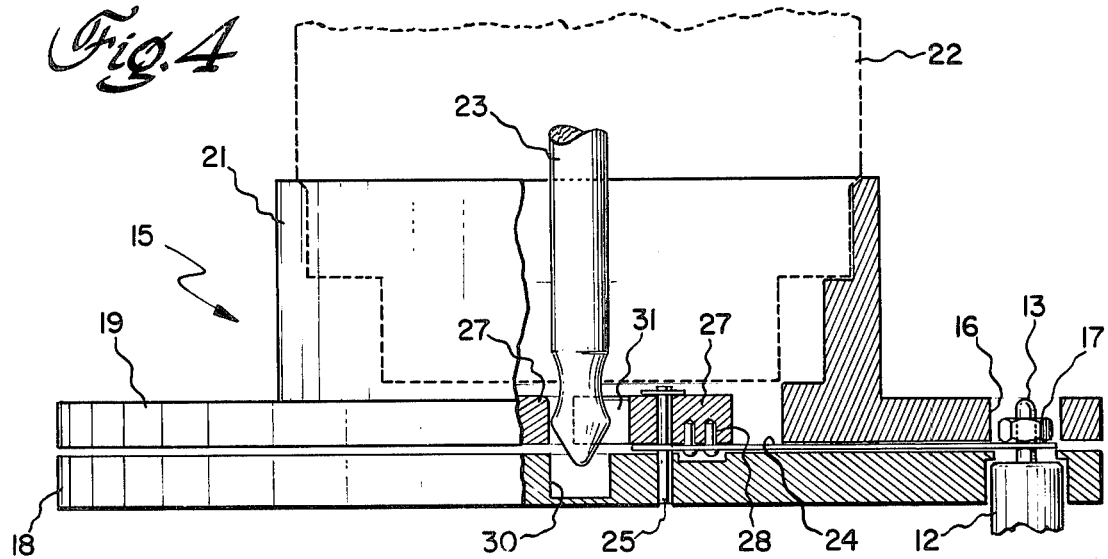
FIG. 4 is a vertical cross section and side view of the dispenser tool, which is placed over a drive socket and projecting guide pin.

Interior details of the nut dispenser are illustrated in FIGS. 3 and 4. A plurality of radially arranged thin gate blades 24, one per through-aperture 16, are pivoted to bottom housing plate 18 by pivot pins 25. Every thin blade 24 has a transverse slot 26 at the outer end, and a cam member 27 is secured to the inner end by screws 28. A return spring 29 urges the blade to a gate closed position partially blocking the the aperture 16 and supporting a nut 17 that has been deposited in the aperture. The center of bottom plate 18 is recessed at 30 to provide clearance for the tip of actuator pin 23.

Both bottom plate 18 and cover 19 are circular, and the interior surface of gripper drum 21 is shaped to receive the end of gripper 22. At assembly station 11 (also see FIG. 1), nut dispenser tool 15 is placed over drive sockets or nut receptors 12 with guide pins 13 projecting into apertures 16, passing through blade transverse slots 26, and loosely engaging the nut apertures. To dispense, the tapered tip of actuator centering pin 23 is lowered into and out of engagement with the cam surfaces 31 of cam members 27 which are attached to blades 24, pivoting the blades to slide horizontally from under threaded nuts 17 and unblocking apertures 16. The nuts are released and slide down guide pins 13 onto drive sockets 12. This prevents the threaded nuts from cocking with respect to the socket center line when they are released from the nut holder. As a result, the nuts engage the drive sockets properly and rapidly and the automatic assembly operation is not delayed. In FIG. 3, one of the four gates is shown with blade 24 in the open position. As actuator pin 23 is retracted, spring 29 returns blade 24 to the gate closed position abutting a stop pin 32. The assembly machine can then immediately remove dispenser tool 15 to permit subsequent assembly operations.

The machine dispensing of nuts takes place before other motor assembly operations. The motor is built up over the assembly station. An end shield is put down, the stator is fit over the end shield, the rotor is inserted, and the other end shield is fit down over the assembly. Tie bolts are dropped down through holes in the end shields and holes in flanges attached to the inside of the stator housing, and the bolts push down guide pins 13 which are retracted within the drive sockets. The bolts are held from turning from above and drive sockets 12 are rotated.

This invention provides a guide pin and a fast operating gate, actuated from a central point for all nuts being dispensed, realizing reliable nut to socket insertion. A primary object is conserving time by fast dispensing of the fastener parts in automatic assembly operations, utilizing a simple, low cost dispensing tool. Instead of threaded nuts, the dispensing tool and system with but little modification will dispense washers onto screws or bolts, and other similar small apertured fastener parts onto appropriate receptors. Two or more such fastener parts can be loaded, one on top of the other, in a tool through-aperture 16 and the entire stack is dispensed when the thin gate is opened.

Different diameter fastener parts are readily accommodated by changing the diameter of aperture 16; several parts, all with different diameters, can be simultaneously dispensed by this tool. Fastener parts with different heights are dispensed with no modification of the tool; parts with different diameter apertures are accommodated with little or no modification. Finally, a part dispenser tool which dispenses only one threaded nut or other fastener part can be provided, having only one through-aperture and pivoted gate blade.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. A dispenser tool for small apertured fastener parts such as screw fastener nuts and washers comprising:
   a housing having at least one through-aperture for passage of the fastener part by gravity, and having a gripper section by which the tool may be picked up and moved from one location to another;
   at least one gate blade which is pivoted to said housing and has a cam surface;
   spring means for urging said blade to a gate closed position at least partially blocking said through-aperture and supporting the fastener part that has been deposited therein; and
   an actuator movable into and out of engagement with said cam surface to pivot said blade to gate open position and unblock said through-aperture so that the fastener part falls and is dispensed.

2. The dispenser of claim 1 wherein said blade has a transverse slot in one end whereby in the gate closed position a guide pin may be inserted into said through-aperture projecting upwardly through said slot and into the part aperture, without restricting motion of said blade from the closed to open position.

3. The dispenser of claim 1 wherein said housing has multiple through-apertures with each of which an additional blade and spring coacts to support and dispense other fastener parts.

4. The dispenser of claim 3 wherein said actuator pivots all of said blades simultaneously.

5. A dispenser tool for screw fastener nuts comprising:
   a housing having a plurality of through-apertures for passage of the nuts by gravity;
   a plurality of gate blades each of which is pivoted to said housing and has a cam surface;
   spring means for urging every blade to a gate closed position at least partially blocking said through-apertures and supporting the nuts that have been deposited therein; and
   an actuator pin movable into and out of engagement with said cam surfaces to pivot said blades which slide from under the nuts so that they fall onto sockets.

6. The dispenser of claim 5 wherein said housing has a gripper section by which the tool may be picked up by a gripper and moved from one location to another.

7. The dispenser of claim 6 wherein said blades are radially arranged within said housing and wherein every blade has a transverse slot in one end through which may pass a retractable pin to guide the nuts as they fall onto the sockets.

8. A system for automatically dispensing small apertured fastener parts such as screw fastener nuts and washers comprising the combination of:
   a part dispenser tool;
   at least one part receptor having an upstanding guide pin; and
   gripper means having a retractable actuator;
   said dispenser having at least one through-aperture for passage of the fastener part by gravity, at least one pivoted gate blade which has a cam surface, and spring means for urging said blade to a gate closed position at least partially blocking said through-aperture and supporting the fastener part which has been deposited therein;
   said dispenser further having a gripper section by which the tool may be picked up by said gripper means and placed over said receptor with said guide pin projecting into said through-aperture and into the fastener part aperture;
   said gripper means moving said actuator into and out of engagement with said cam surface to pivot said blade and unblock said through-aperture so that the fastener part slides down said guide pin and falls onto said receptor.

9. The system of claim 8 wherein said part dispenser tool is comprised of a bottom plate on which said blade and spring means are mounted, and a cover which includes said gripper section.

10. A system for automatically dispensing screw fastener nuts comprising the combination of:
    a nut dispenser tool;

multiple drive sockets each having a retractable guide pin; and gripper means having a retractable actuator pin;

said dispenser having a plurality of through-apertures for passage of the nuts by gravity, a plurality of pivoted gate blades each having a cam surface at one end and a transverse slot at the other end, and a spring urging every blade to a gate closed position blocking the associated through-aperture and supporting the nut which has been deposited therein;

said dispenser further having a gripper section by which the tool may be picked up by said gripper means and placed over said drive sockets with said guide pins projecting into said through-apertures and passing through said blade transverse slots and the nut apertures;

said gripper means moving said actuator pin into and out of engagement with said cam surfaces to pivot said blades to slide horizontally from under the nuts so that they slide down said guide pins and fall onto said drive sockets.

11. The system of claim 10 wherein said dispenser tool has a housing comprised of a circular bottom plate on which said blades and springs are mounted, and a circular cover having a drum which is said gripper section.

12. A system for automatically dispensing screw fastener nuts comprising the combination of: a nut dispenser tool; multiple drive sockets each having a retractable guide pin; and gripper means having a retractable actuator pin; said dispenser having a plurality of through-apertures for passage of the nuts by gravity, a plurality of movable gates each having an actuator surface and a guide pin accommodating slot, and means holding every gate in a gate closed position blocking the associated through-aperture and supporting the nut which has been deposited therein; said dispenser tool further having a gripper section by which the dispenser tool may be picked up by the gripper means and placed over the drive sockets with the guide pins projecting into the through-apertures and passing through the guide pin accommodating slots and nut apertures; said gripper means operative for moving the actuator pin into and out of engagement with the gate actuating surfaces for sliding the gates horizontally from under the nuts so that the nuts slide down the guide pins and fall onto the drive sockets.

13. A system for automatically dispensing screw fastener nuts comprising the combination of: a nut dispenser tool; multiple drive sockets each having a retractable guide pin; and gripper means having a retractable actuator pin; said dispenser having a plurality of through-apertures for passage of the nuts by gravity, a plurality of movable gates each having a guide pin accommodating slot, with said gates being positionable in a gate closed position blocking the associated through-aperture and supporting the nut which has been deposited therein; said dispenser tool further having a gripper section by which the dispenser tool may be picked up by the gripper means and placed over the drive sockets with the guide pins projecting into the through-apertures and passing through the guide pin accommodating slots and nut apertures; said actuator pin being controllably movable for causing the gates to slide horizontally from under the nuts so that the nuts slide down the guide pins and fall onto the drive sockets.

* * * * *